Figure 1:
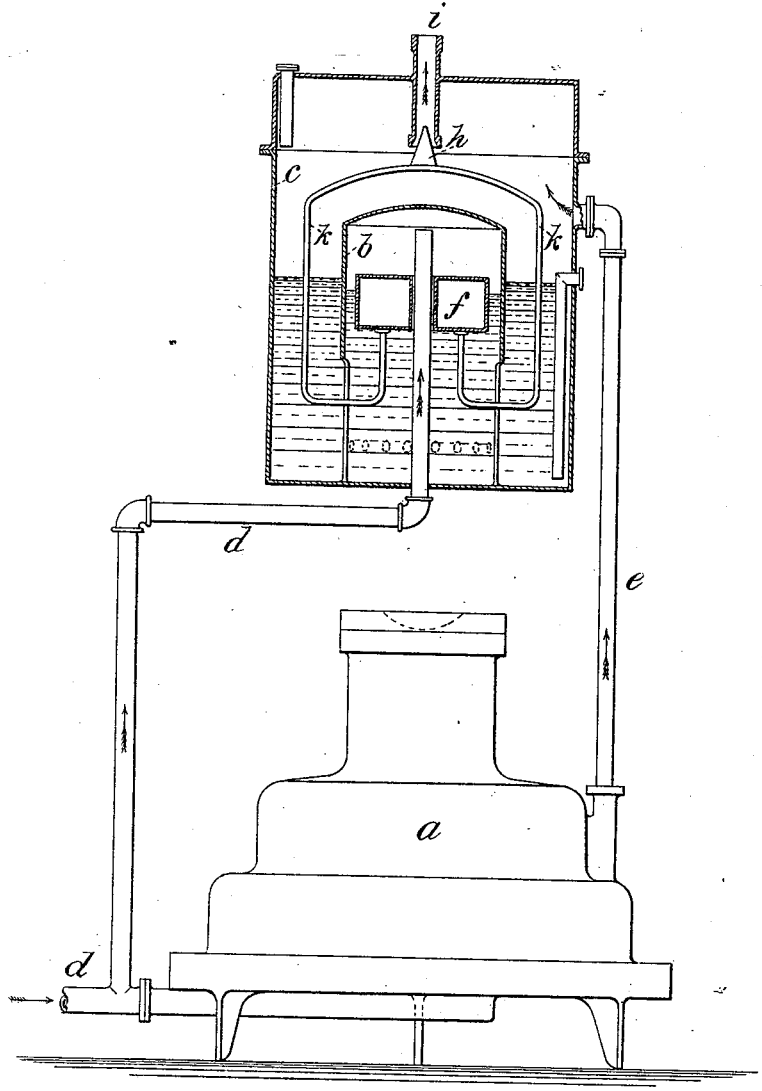

2 Sheets—Sheet 1.

W. N. MILSTED.
Meter-Governor.

No. 199,925. Patented Feb. 5, 1878.

WITNESSES:
Walter Pell
Wm Kemble Hall

Wm N Milsted
INVENTOR.

N. PETERS, PHOTO-LITHOGRAPHER, WASHINGTON, D C

2 Sheets—Sheet 2.

W. N. MILSTED.
Meter-Governor.

No. 199,925.     Patented Feb. 5, 1878.

WITNESSES:

Walter Pell

Wm Kemble Hall.

Wm N Milsted
INVENTOR.

N. PETERS, PHOTO-LITHOGRAPHER, WASHINGTON, D. C.

UNITED STATES PATENT OFFICE.

WILLIAM N. MILSTED, OF NEW YORK, N. Y.

IMPROVEMENT IN METER-GOVERNORS.

Specification forming part of Letters Patent No. 199,925, dated February 5, 1878; application filed November 2, 1877.

*To all whom it may concern:*

Be it known that I, WILLIAM N. MILSTED, of New York, in the county and State of New York, have invented a certain new and useful Improvement in Meter-Governors, of which the following is a specification:

The object of the said invention is to shut off the flow of any gas or liquid passing through a meter when there is a leakage, by wear or otherwise, sufficient to prevent the working of the meter. It depends for its action upon the fact that any meter, however delicate in its construction or slow in its action, requires force or pressure to work it and effect the registration, and that the amount of this force is indicated by the difference between the pressure of the fluid on entering the meter and the pressure after it has left.

To accomplish this object, and in accordance with this principle, the said governor consists of a vessel with two chambers or compartments, of which one is connected with the supply-pipe to the meter, and the other receives the gas or water, or other fluid under measurement, after it has passed through the meter, the difference of the pressure in the two chambers—acting through the intervention of a float, or a piston, or a flexible diaphragm—serving to operate a valve that regulates the passage of the fluid.

When the meter is working at any ordinary rate an increased consumption of the gas, for instance, lessens the pressure in the chamber of the governor through which it passes, while the pressure in the other chamber remains unaltered, and the movement of the diaphragm or float that is occasioned by the increased difference opens the valve to permit the additional flow of gas. In the same manner, if the consumption be decreased, the difference between the pressures is lessened, and the consequent movement of the float or diaphragm tends to close the regulating-valve. So, too, when the meter has become defective by wear or neglect, and the gas flows through without registering, there is no force required to work the meter, and the gas leaves it with the same pressure at which it entered, and the equality of the pressures in the two chambers of the governor on the piston or the diaphragm, or acting on the float, serves to close the valve that regulates the supply.

To enable others skilled in the arts to which it appertains to make and use my invention, I will proceed to describe its construction and operation with reference to the drawings.

Figure 2:
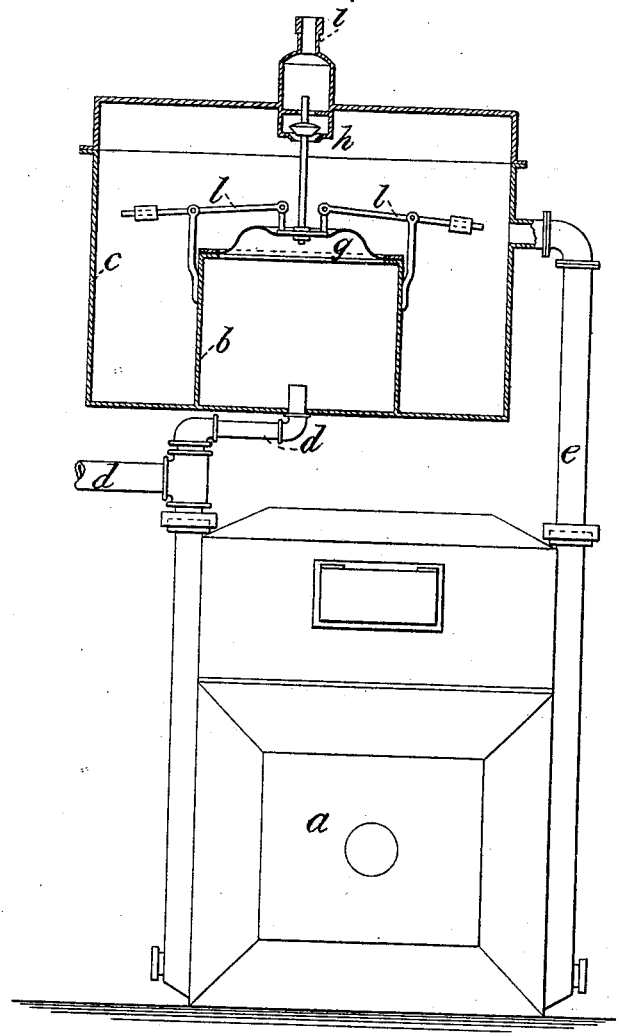

Figure 1 represents, in section, a float-governor, and Fig. 2 a diaphragm-governor, both operating on the same principle, and both attached to meters.

In the two figures, $a$ is the meter, and $b$ and $c$ the two chambers of the governor. The pipe $d$ supplies the meter and one chamber, $b$, of the governor, and the pipe $e$ connects the other chamber, $c$, with the meter. The preponderance of the pressure in the chamber $b$ over that in the chamber $c$, acting on the sealing liquid and the float $f$ in Fig. 1, or on the diaphragm $g$ in Fig. 2, holds open the valve $h$ in the pipe $i$, that regulates the flow of the gas or water, or other fluid or liquid under measurement.

When the pressure in the two chambers is the same the valve remains imperfectly closed, and in practice allows only enough gas to leak through to permit the machine to be again started.

In Fig. 1 the wires $k$, that connect the float $f$ and the valve $h$, pass through slots in the sides of the chamber $b$, below the surface of the mercury or other sealing fluid.

In Fig. 2 the weighted levers $l$ serve to counterbalance, as may be required, the weight of the diaphragm and valve.

I claim as my invention—

The chambers $b$ and $c$ and the connections $d$ and $e$, arranged with relation to the measuring mechanism, and combined with a float, or its equivalent, for working the valve $h$, substantially in the manner and for the purpose described.

WM. N. MILSTED.

Witnesses:
WALTER PELL,
WM. KEMBLE HALL.